March 17, 1959  F. E. NELSON  2,877,910
CONTAINERS AND ELEVATING AND DUMPING APPARATUS
THEREFOR FOR LOAD-CARRYING VEHICLES
Filed April 3, 1957  5 Sheets-Sheet 1

INVENTOR.
Floyd E. Nelson.
BY
Fishburn and Gold
ATTORNEYS.

INVENTOR.
Floyd E Nelson.

March 17, 1959 F. E. NELSON 2,877,910
CONTAINERS AND ELEVATING AND DUMPING APPARATUS
THEREFOR FOR LOAD-CARRYING VEHICLES
Filed April 3, 1957 5 Sheets-Sheet 3

INVENTOR.
Floyd E Nelson.
BY
Fishburn and Gold
ATTORNEYS.

INVENTOR.
Floyd E. Nelson.

March 17, 1959

F. E. NELSON 2,877,910

CONTAINERS AND ELEVATING AND DUMPING APPARATUS
THEREFOR FOR LOAD-CARRYING VEHICLES

Filed April 3, 1957

INVENTOR.
Floyd E. Nelson.

BY
Fishburn and Gold
ATTORNEYS.

United States Patent Office 2,877,910
Patented Mar. 17, 1959

2,877,910

CONTAINERS AND ELEVATING AND DUMPING APPARATUS THEREFOR FOR LOAD-CARRYING VEHICLES

Floyd E. Nelson, Kansas City, Kans.

Application April 3, 1957, Serial No. 650,439

11 Claims. (Cl. 214—302)

This invention relates to apparatus for handling of bulk material such as refuse and the like, and more particularly, to containers for such material and apparatus on load-carrying vehicles for connection therewith for elevating and dumping of such containers in the loading of the contents into the vehicle.

There are in use load-carrying vehicles having various shaped bodies having openings in the upper portions thereof through which material is delivered to the interior of the bodies. Some load-carrying vehicles, particularly for refuse and the like, have bodies termed "packer bodies" wherein a movable bulk head is operated to compress the material at one end of the body. It is common practice to collect material such as refuse in containers and then dump the contents into the truck bodies which operation requires that the containers be lifted to dumping position. Hand dumping of such containers is difficult, dangerous and substantially impossible when the containers are large.

The principal objects of the present invention are to provide a load-carrying vehicle having a load receiving opening in the upper portion thereof with elevating apparatus that is removably connectible to containers for raising the containers and dumping same; to provide such elevating apparatus and container connectors with controls whereby the elevating, dumping and lowering of the containers is fully mechanical; to provide container fittings and connectors removably attachable thereto which are positively held in connected relation when in load-lifting position; to provide such container fixtures and connectors for cooperation with a pair of flexible load-lifting members connectible with the connectors for applying the lifting loads substantially centrally thereof; to provide such an elevator with guide tracks flared at their lower portions to cooperate with members on the connectors and the flexible load-lifting members to move a container from a position spaced from the tracks to a centering load-lifting position; to provide a container elevator with portions cooperating with members on the container to stop the container after partially elevating same and then automatically pivotally connect the container for the dumping of same; to provide such an elevator with container engaging portions limiting tilting movement of the container into the load-carrying body opening and operative to move the container out of the opening into lowering position; to provide such an elevator with hydraulic extensible members for positively controlling movement of the flexible load-lifting members and the containers during raising, dumping and lowering of the containers; and to provide containers and elevating and dumping apparatus therefor on load-carrying vehicles that is economical to manufacture, efficient and safe in operation with detachable containers that may be left in various places for collection of material leaving the vehicle free thereof to travel to various locations.

In accomplishing these and other objects of the present invention, I have provided improved details of structure, the preferred form of which is illustrated in the accompanying drawings, wherein.

Referring more in detail to the drawings:

1 designates a truck having a wheel supported chassis 2 and cab 3 and a load-carrying body 4 which may be of various types such as packer bodies wherein refuse and the like is dumped into the body and then compressed by a movable partition therein. The illustrated body 4 has a fill opening 5 in the upper portion thereof normally closed by a door or cover 6. The fill opening 5 is preferably in the upper forward portion of the body 4 and is of suitable size whereby containers 7 may be moved therein for dumping the contents of said containers.

Container elevating apparatus 8 is mounted on the body 4 for moving elongate flexible members such as ropes or cables 9 and 10 provided with connectors 11 at their free ends adapted for releasable connection with the containers 7.

Figure 1:
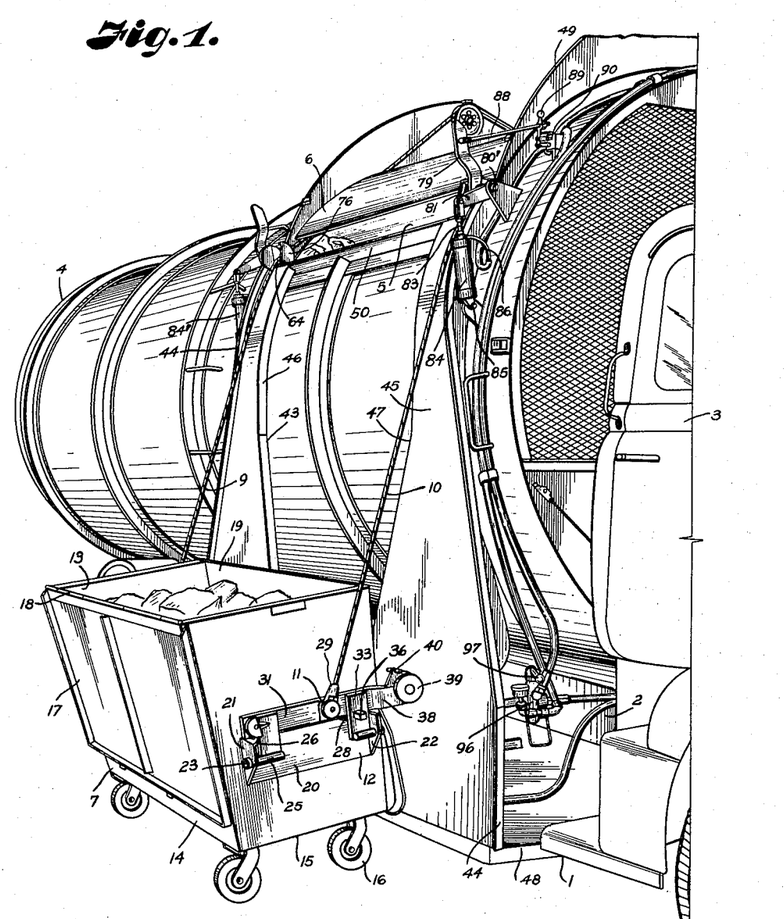
Fig. 1 is a perspective view of a rear portion of a truck having an elevator on the body thereof with a container connected and in position for elevating.
Figure 2:
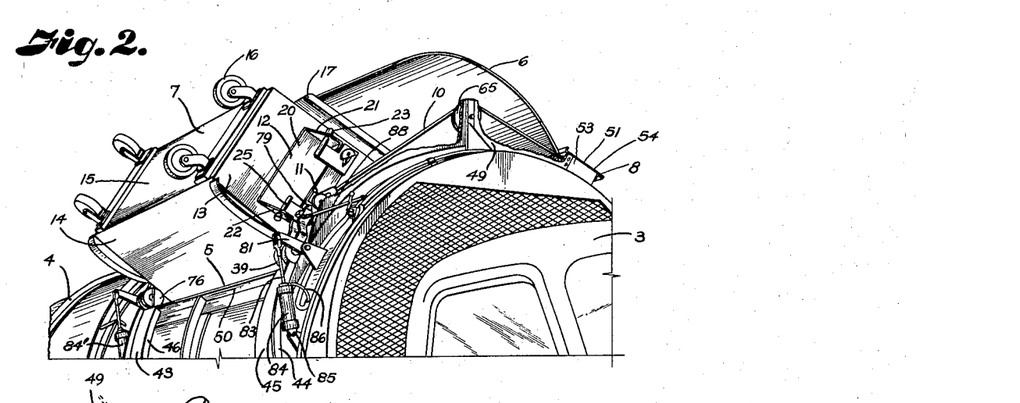
Fig. 2 is a partial perspective view of the truck body and container in container dumping position.
Figure 6:
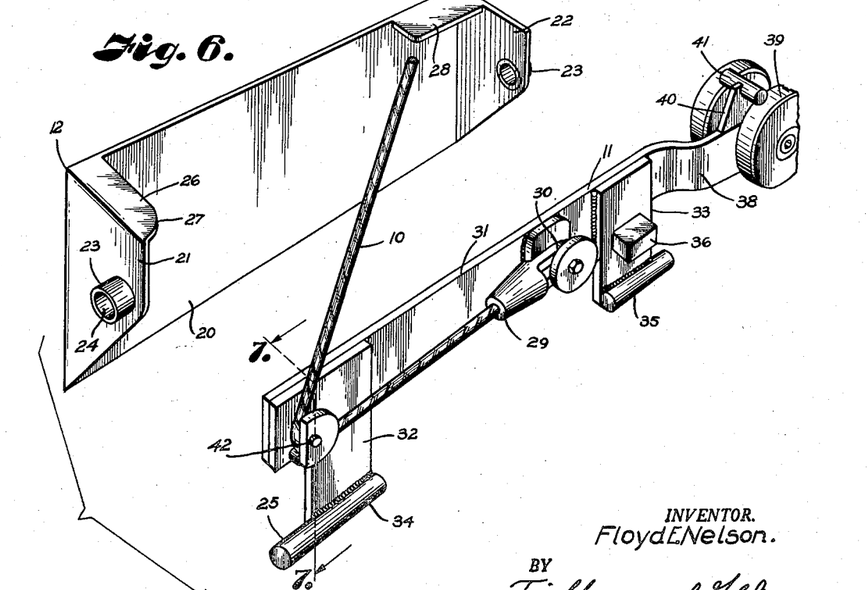
Fig. 6 is a disassembled perspective view of the container bracket and container connector.
Figure 7:
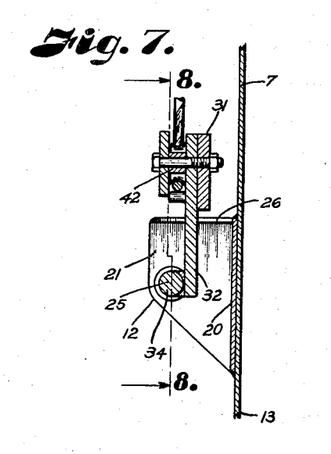
Fig. 7 is a sectional view through the container bracket and connector taken on the line 7—7, Fig. 8.
Figure 8:
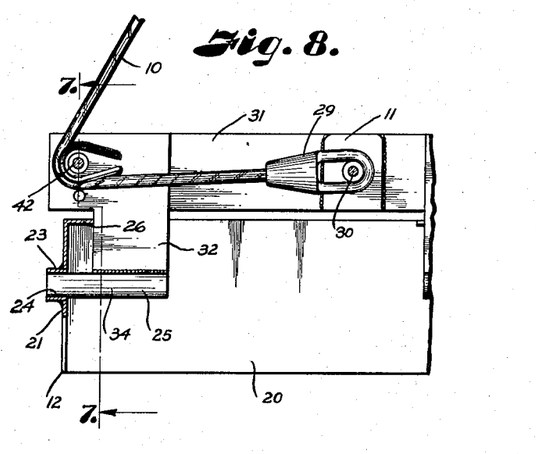
Fig. 8 is a sectional view through the container connector and bracket taken on the line 8—8, Fig. 7.
Figure 9:
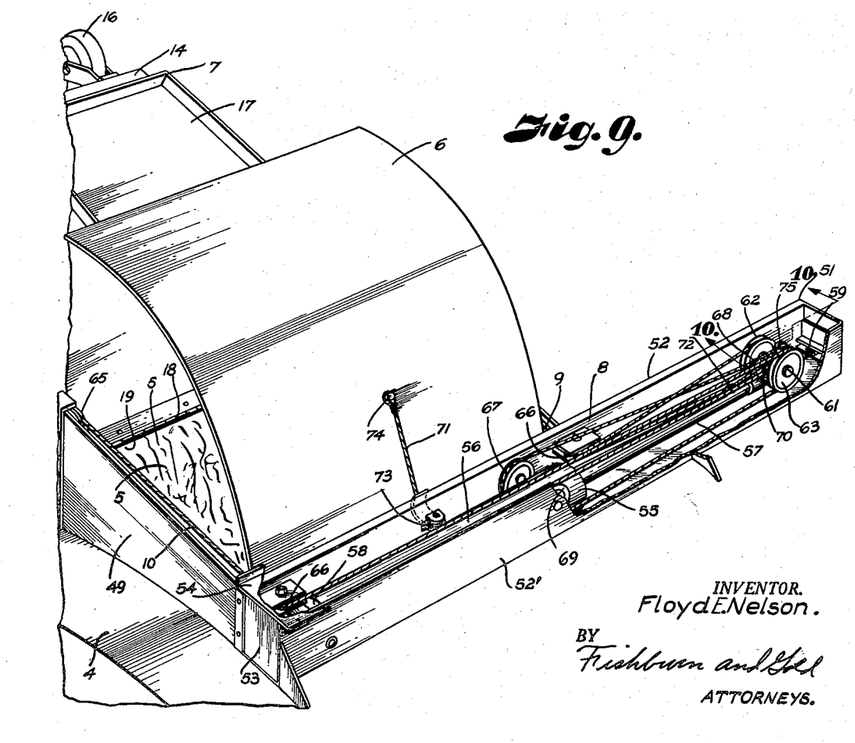
Fig. 9 is a partial perspective view of the upper portion of the truck body illustrating the elevator cable operating mechanism.

The containers 7 each preferably include members 12 for connection of the connectors 11 and are of suitable frame or wall structures having sufficient rigidity to support the members 12. In the illustrated container structure, there are opposed end walls 13 and opposed side walls 14 having a connected bottom 15. Rollers or casters 16 or other suitable ground-engaging members are preferably mounted on the containers for facilitating movement thereof over the ground or other supporting surface. The rollers may be omitted and the container rest on the bottom thereof. A cover 17 is hingedly mounted as at 18 at the upper edge of one of the side walls 14 to cover the top opening 19 of the container. The members 12 are mounted on the opposed ends 13 of the container and preferably below the mid-heighth of the end walls so as to be below the center of gravity of the loaded containers. The members 12 in the illustrated structure each include an upright plate 20 suitably secured to the end walls with the ends of the plate terminating in spaced relation to the sides of said end walls as illustrated in Fig. 1 and may either be fixed permanently or detachable. The connector members 12 include spaced parallel upright members 21 and 22 extending outwardly from the respective opposed end walls and substantially perpendicular thereto, and each having bearing members 23 therein axially aligned with the axis thereof extending substantially transversely of the container, said bearing members having bearing openings 24 for receiving pins or trunnions 25 on the connectors 11 as later described. The members 21, as illustrated in Fig. 6, are plate-like with the portion below the bearing members 23 being inclined downwardly toward the end wall of the container. The upper end of the member 21 terminates in a flange 26 extending toward the member 22 with the outer end of the flange 26 rounded as at 27. A flange 28 extends from the member 22 toward the member 21 and adjacent the plate 20, said flanges 26 and 28 cooperating to provide stops as later described.

The connectors 11 in the illustrated structure include eye members 29 secured to the ends of the cables or ropes 9 and 10 with the eyes pivotally connected as at 30 to respective bars 31. The connectors 11 on the cables 9 and 10 are the same except that one is for the right hand and the other is for the left hand ends of the container. Arms 32 and 33 are suitably secured to each of the bars 31 and extend laterally therefrom and have bearing members 34 and 35 respectively on the ends thereof with the portions of the bearing members extending beyond the arms 32 and 33 forming the pins or trunnions 25. The arm 33 has a lug 36 extending outwardly therefrom for engaging a control lever as later described. One end of each of the bars 31 has an offset extension 38 on which are mounted axially spaced rollers 39 for engaging a track as later described and said extension has an upstanding portion 40 provided with a cam lug 41 to cooperate with tilting mechanism as later described. The connectors 11 may be used on containers having different widths and thereby different capacities. For lifting of larger capacity containers, the bars 31 remote from the extensions 38 are provided with lugs 42 around which the cables 9 and 10 may be extended whereby the effect of the lifting force of the cables is more nearly the center of larger containers (not shown). This arrangement permits the loading of various size containers, for example, one yard, two yard or more, with the size of the container varying as to heighth and width to provide the different capacities, the length or distance between the opposed end walls 13 preferably remaining the same on said various size containers. The connector structure has such strength and rigidity that the containers may be light economical structures. The connectors 11 are adapted for removable connection to the container by the bar members 31, as illustrated in Fig. 6, being substantially inverted and the ends of the trunnion 25 on the arms 32 inserted into the bearing openings 24 until the respective arm engages the respective member 21. In that position, the end of the pin or trunnion on the arm 33 may be inserted in the bearing opening on the member 22, and the bar moved until the adjacent edge of the arm 33 engages the side of the member 22. Then the bar is swung upwardly about the axis of the trunnions or pins 25 to a substantially upright position wherein the adjacent edges of the arm 32 and flange 26 engage to substantially retain the bar 31 against longitudinal movement relative to the axis of the trunnions or pins 25. The arm 33 will also engage the flange or stop 28 and then tension on the ropes 9 and 10 will hold the connectors in upright position during raising and lowering of the containers.

To disconnect the connectors from the containers, the ropes are slackened and the bars swung downwardly whereby they may be removed by reversing the operations used to make the assembly or connection.

The load-carrying body 4 is provided with spaced tracks or guide members 43 which extend downwardly from adjacent the opening 5 along one side of the body. The tracks 43 have outwardly extending flanges 44 at their remote edges with the spacing between said flanges adjacent the fill opening 5 being such that they will be engaged by adjacent rollers 39 on the connectors 11 of a container being elevated whereby the containers will be centered relative to the opening 5 as they approach same. The tracks 43 include plate members 45 adapted to be engaged by the rollers 39 that are suitably reinforced by the flanges 44 and inwardly extending flanges 46 at the inner edges of said plates 45. The plate portions 45 adjacent the opening 5 are of suitable width to be engaged by the rollers 39 of the respective connector. Below the opening 5 at a suitable space therefrom, the adjacent edges of the track members are flared inwardly as at 47, and the outer edges are flared outwardly to present wide lower portions of the track members whereby the rollers 39 of the connector on a container may be drawn into engagement with the track members without the containers being centered relative to the opening 5. It is also preferable that the trackways be sloped slightly outwardly and downwardly from a vertical for facilitating movement of the container relative thereto. The bottom ends of the track members 43 are preferably suitably braced and reinforced by connections extending to the chassis. In the illustrated structure, a platform 48 forms part of the track bracing structure. In the illustrated structure, the rollers 39 are spaced ouwardly from the ends of the containers, and the flanges 44 are in alignment with upstanding walls 49 arranged at the front and rear of the opening 5 and the lower portion of said opening is provided with a flange 50 to provide reinforcing at the edges of said fill opening.

Figure 10:
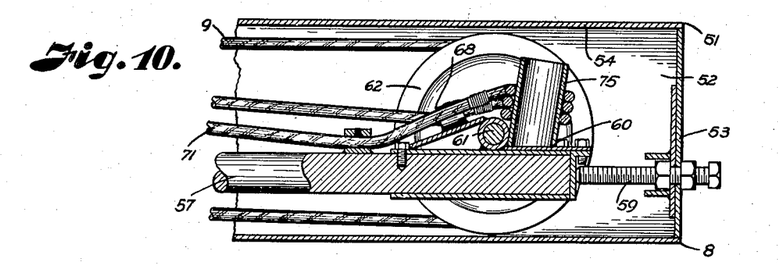
Fig. 10 is a longitudinal sectional view through an end portion of the cable operator mechanism taken on the line 10—10, Fig. 9.

The elevating mechanism 8 is arranged at the side of the fill opening 5 opposite from the tracks 43 and includes a housing 51 having one side wall 52 connected with the walls 49 for further providing rigidity to the walls of the body 4 adjacent the opening 5. The housing 51 is an elongated receptacle having a side wall 52' spaced from the side wall 52 and opposed connected end walls 53. The housing 51 is closed by a cover 54 suitably secured thereon providing an enclosure in which is located an hydraulic extensible member 55. The hydraulic extensible member includes a cylinder 56 with a piston rod 57 extending from one end thereof and the other end 58 suitably secured adjacent one end of the housing. The other end of the housing has an adjustable stop 59 adapted to be engaged by the end of the piston rod 57 to limit the extension of the extensible member. The end of the piston rod 57 remote from the cylinder 56 is provided with a fixture 60 having a transverse shaft 61 on the ends of which are rotatably mounted pulleys 62 and 63. The ropes 9 and 10 extend upwardly along the tracks 43 over guide rollers 64 adjacent the upper ends of the tracks, guide rollers 65 rotatably mounted on the walls 49, and through suitable openings in the housing wall 52 and over rollers 66 rotatably mounted in the housing 51. The rope 9 extends around one of the rollers 66, pulley 62 and back over a pulley 67 with the end suitably secured as at 68 to the fixture 60. The rope 10 extends around the other roller 66, over the pulley 63, back around a pulley 69 and has its end secured as at 70 to the fixture 60. This arrangement of the pulleys and extensible member 55 is such that the rope is moved a linear distance that is a multiple of the distance the extensible member is extended or retracted. In the illustrated structure, the ropes are moved on a ratio of 3 to 1 relative to the movement of the piston rod 57. A rope 71 has one end secured as at 72 to the piston rod and extends therefrom around a pulley 73 through an opening in the wall 52 and has the other end connected as at 74 to the cover 6. In the illustrated structure, Fig. 10, the ropes 9, 10 and 71 extend around a pedestal 75 on the fixture 60 to further anchor the rope.

Figure 3:
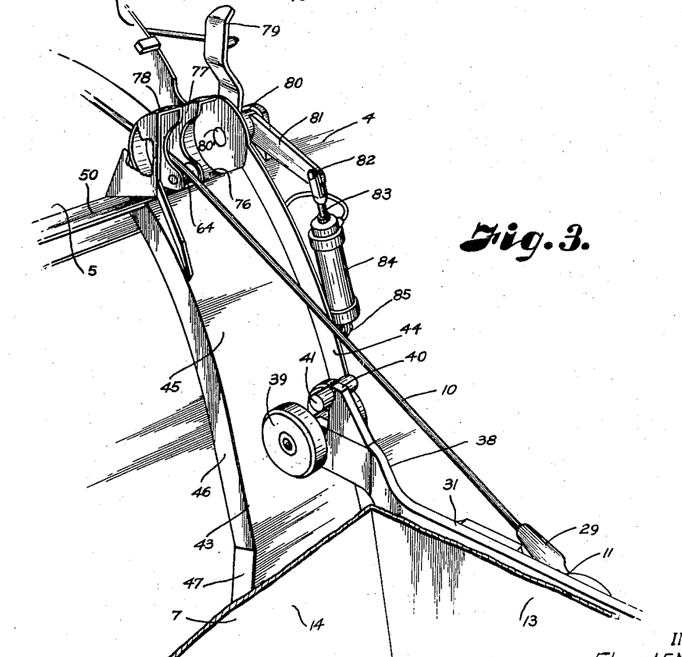
Fig. 3 is an enlarged partial perspective view illustrating the container connector engaged in a guide track and approaching the tilting latch mechanism.
Figures 4, 5:
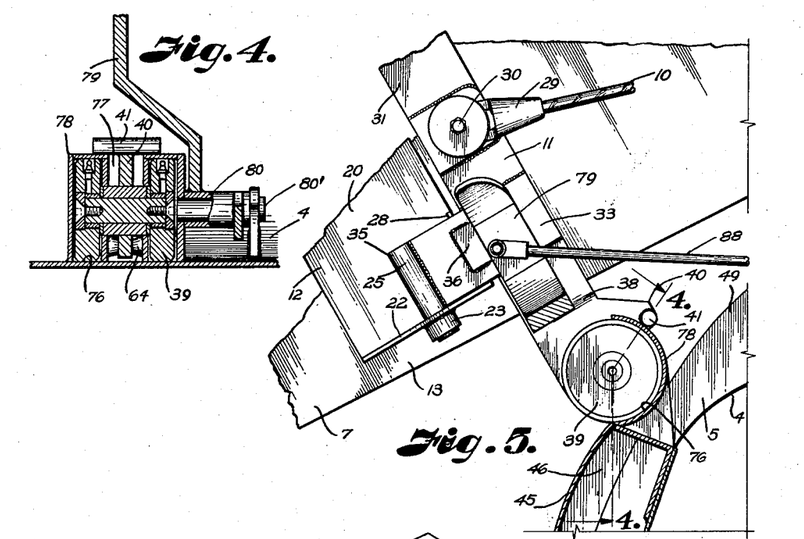
Fig. 4 is a longitudinal sectional view through the container tilting latch taken on the line 4—4, Fig. 5.
Fig. 5 is a partial end elevation of the container and connector engaged with the tilting latch structure.

The guide rollers 64 are located at the upper ends of the guide tracks 43 between spaced depressed pockets 76 adapted to receive the rollers 39 therein when a container is elevated to a position where the tilting of the container would start for dumping of same. The pockets 76 are spaced as at 77 and have peripheral portions 78 whereby when the rollers 39 are seated in the pockets and the container tilted the upstanding member 40 on the respective connectors will pass through the respective space 77 and the lugs 41 will automatically engage the exterior of the peripheral housings 78 to hold the rollers 39 in the pockets during tilting and dumping of the containers. This structure automatically connects the containers relative to the tracks after partial elevation of the containers. Levers 79 are carried on hubs 80 mounted on shafts 80' adjacent the exterior of the walls 49 and substantially coaxially of the axis of the rollers 39 when positioned in the pockets 76. The levers 79 are suitably bent as illustrated in Fig. 3 whereby as the container is tipped to dumping position, the lugs 36 will engage said levers. Fixed on the hubs 80 are arms 81 pivotally connected as at 82 to the ends of piston rods 83 extending from cylinders 84 and 84', there being a lever 79 and cylinder together with all of the connections of same on opposite sides of the tracks, as illustrated in Fig. 1. The ends of the cylinders 84 and 84' are pivotally mounted as at 85 relative to the body 4. The upper portion of the cylinders 84 is connected by a conduit 86 and the other cylinder 84' is connected by a conduit 86' with an hydraulic system, as later described. The lower portion of each of said cylinders is provided with a suitable vent 87. One of the levers 79 is connected by a link 88 having a lost motion connection with a control lever 89 of a three-way single-acting open center valve 90.

Figure 11:
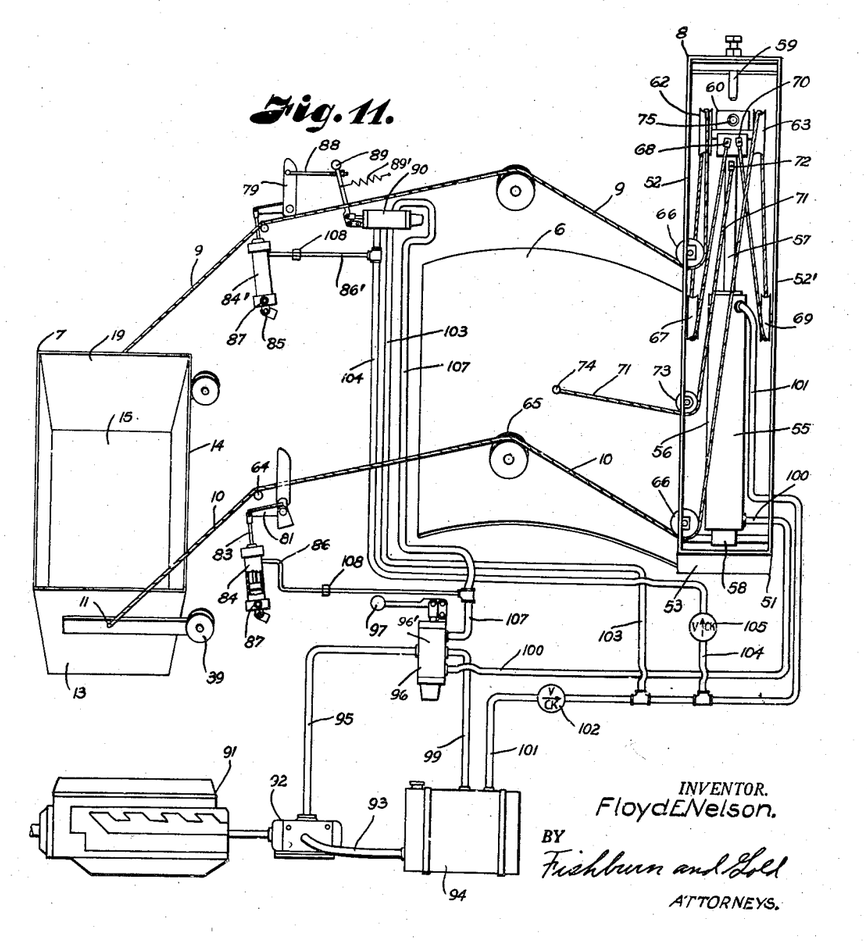
Fig. 11 is a diagrammatic view of the hydraulic circuit for the container elevating and dumping mechanism.
Figure 12:
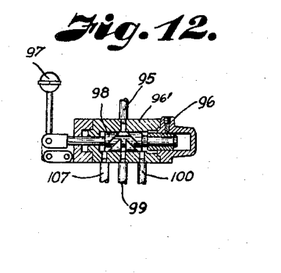
Fig. 12 is a sectional view of the valve 97.

In the hydraulic system and controls, the engine 91 of the vehicle or other suitable source of power drives a pump 92 having its inlet connected by a duct 93 with a reservoir 94 containing a supply of hydraulic liquid. The discharge from the pump 92 is delivered by a duct 95 to a four-way double-acting open center valve 96 having a hand lever 97 for controlling same. The valve 96 is particularly illustrated in Fig. 12 and includes a housing 96' in which is reciprocably mounted a piston type valve 98. When the piston valve is in neutral position, the fluid from the pump will flow through the valve and through a duct 99 and return to the reservoir 94. The valve 96 also has a port communicating through a duct 100 with the cylinder 56 remote from the end from which the piston rod 57 extends. The other end of the cylinder 56 is connected by a duct 101 leading to the reservoir 94; however, a check valve 102 is located in said duct 101 as illustrated in Fig. 11 to prevent flow to the reservoir. Between the check valve 102 and the cylinder 56, there is communication of the duct 101 through a branch 103 to the valve 90. There is also communication through a duct 104 to said valve 90, said duct 104 having a check valve 105 therein whereby flow can only be from the duct 101 toward said valve 90. The duct 104, between the check valve 105 and the valve 90, has communication through the conduit 86' with the upper portions of the cylinder 84'. The valve 96 also has a port connected by a duct 107 with a port in the valve 90, the duct 86 also communicating the upper end of the cylinder 84 with the duct 107.

In operating a structure constructed and assembled as described, the vehicle with the elevator thereon is driven to the location of a container 7, whereby the container 7 is near the trackway 43. Power is then applied to the pump 92 and by manipulation of the valve lever 97 the cables 9 and 10 may be drawn until the connectors are in position for attachment to the members on the ends of the container. The connectors 11 are then positioned whereby the pins 25 may be inserted in the bearing openings 24 and the connectors then swung upwardly to a position as shown in Fig. 1. Then the valve handle 97 is moved to operate the valve 96 whereby flow of liquid through the duct 99 is stopped and liquid under pressure is delivered through the duct 100 to the extensible member cylinder 56 to move the piston rod outwardly thereof. Extension of the extensible member 55 pulls the ropes or cables 9 and 10 causing the container to move toward the trackways until the rollers 39 are engaged therewith. Then further pulling movement of the cables 9 and 10 lifts the container and causes the rollers 39 to roll up the trackway and automatically center the container relative to the opening 5 during the upward movement. Simultaneously with the upward movement of the container, the rope 71 is also pulled to swing the cover 6 upwardly. As the extensible member 55 is extended, fluid from the piston rod end of the cylinder is discharged through the duct 101, duct 104, check valve 105 and valve 90, duct 107, valve 96 and duct 99 to the reservoir 94. When the container reaches the heighth whereby the rollers 39 move into the pockets 76, further lifting action applied by the ropes 9 and 10 causes the container connectors and container to pivot about the axis of the rollers 39 and effect engagement of the lugs 41 with the outer periphery of the housing 78 to maintain the pivotal connection of the connectors 11 with the pockets 76. Then continued movement upwardly of the ropes 9 and 10 tilts the container until the lugs 36 engage the lever arms 79 and then further tilting of the container also effects simultaneous pivotal movement of the lever 79 also moving the pistons upwardly in the cylinders 84. There are restricted orifices 108 in the ducts 86 and 86' so as to prevent excessive tilting speed of the containers 7, and after the containers have been tilted to the point where the center of gravity is such that weight thereof tends to cause the containers to fall over into dumping position, the orifices 108 retard the dumping movement. There is a loose motion connection between the link 88 and the lever 89 whereby a spring 89' moves the lever 89 to shift the valve positions in valve 90 when the tilting of the container starts. This shifting of the valve closes the port communicating with the duct 103. After the contents of the container are dumped in the body 4, the lever 97 is moved in the opposite direction to provide communication from the cylinder 56 through the duct 100, valve 96 and duct 99 to the reservoir 94, and the fluid pressure from the pump 92 is delivered through the duct 95, the valve 96, the duct 107, valve 90 and duct 104 whereby the fluid pressure is applied through the ducts 86 and 86' to the cylinders 84 and 84' to cause the levers 79 to move the connectors and containers upwardly out of the opening 5 to a position relative to the tracks for lowering to the ground. During this upward tilting movement, the duct 103 is blocked so that no fluid pressure is applied through said duct 103 or duct 101 to the extensible member 55. The extensible member having no fluid pressure acting therein allows the cables 9 and 10 to be drawn back in following movement of the container under the power of the cylinders 84 and 84'. As the lever 79 nears the end of its pivotal movement in moving the container to lowering position the lost motion connection between the link 88 and the valve lever 89 is such as to return the valve 90 to its original position. After the valve 90 has been shifted back to its original position, then the pressure from the pump is supplied through the duct 107, valve 90, duct 103, duct 101, to the cylinder 56, forcing the piston therein to retract the extensible member, the liquid from the other end of the cylinder flowing through the duct 100, valve 96 and duct 99 to the reservoir. The weight of the container will pull the cables 9 and 10 downwardly to take up any slack therein as the extensible member is retracted by fluid pressure until the container is on the ground and simultaneously the cover 6 is moved to closed position. Further retraction of the extensible member will allow the ropes 9 and 10 to be pulled further to give sufficient slack whereby the connectors may be disconnected from the containers. The hydraulic mechanism may then be operated to raise the connectors to a suitable position for fastening same whereby the vehicle can move to the next container location.

It is to be understood that while I have illustrated and described one form of my invention, it is not to be limited to the specific form or arrangement of parts herein described and shown except insofar as much limitations are included in the claims.

What I claim and desire to secure by Letters Patent is:

1. In a container loading and unloading apparatus, the combination of a container having connected opposed side and end walls and a bottom wall, an elevating means having spaced flexible load-lifting members operable for up and down movement, pairs of spaced members fixed relative to the container and extending outwardly from opposed walls thereof, said members of each pair having aligned bearing openings therein and arranged substantially on axes extending transversely of the container, a pair of connectors for removable connection with the pairs of members on said container, aligned trunnions on the connectors and extending therefrom for pivotal mounting in the aligned bearing openings in said pairs of members, the trunnions being suitably arranged relative to the spacing of the members of each pair whereby one trunnion is insertable into one bearing opening and the connector moved to position the other trunnion between said members and then movement of the connector in the opposite direction inserts said other trunnion in the other of the aligned bearing openings, means fixed relative to the pairs of members and engageable by said connector in response to upward swinging thereof to hold said connector against movement longitudinally of the trunnions and to retain the trunnions in said bearing openings, and means pivotally connecting said flexible members to the respective connectors below the center of gravity of the container and intermediate the side edges of the walls having the pairs of spaced members thereon whereby operation of the elevating means to raise the flexible members will elevate the container.

2. In a container loading and unloading apparatus, the combination of a container having connected opposed side and end walls and a bottom wall, an elevating means having spaced flexible load-lifting members operable for up and down movement, pairs of spaced members fixed relative to the container and extending outwardly from opposed walls thereof, said members of each pair having aligned bearing openings therein and arranged substantially on axes extending transversely of the container, a pair of connectors for removable connection with the pairs of members on said container, each of said connectors having an elongate bar, aligned trunnions fixed relative to the bars and extending therefrom for pivotal mounting in the aligned bearing openings in said pairs of members, the trunnions being suitably arranged relative to the spacing of the members of each pair whereby one trunnion is insertable into one bearing opening and the bar moved to position the other trunnion between said members and then movement of the bar in the opposite direction inserts said other trunnion in the other of the aligned bearing openings, cooperative means on the pairs of members and bars and responsive to upward swinging of the bar to hold said bar against movement longitudinally of the trunnions and to retain the trunnions in said bearing openings, and means pivotally connecting said flexible members to the respective bars of the connectors below the center of gravity of the container and intermediate the side edges of the walls having the pairs of spaced members thereon whereby operation of the elevating means to raise the flexible members will elevate the container.

3. In a container loading and unloading apparatus, the combination of a container having connected opposed side and end walls and a bottom wall, an elevating means having spaced flexible load-lifting members operable for up and down movement, pairs of spaced members fixed relative to the container and extending outwardly from opposed walls thereof, said members of each pair having aligned bearing openings therein and arranged substantially on axes extending transversely of the container, a pair of connectors for removable connection with the pairs of members on said container, each of said connectors having an elongate bar, spaced laterally extending arms on said bars with the spacing between the outer sides of said arms of each bar being less than the space between the members of each pair on the container, aligned trunnions on the ends of the arms and extending therefrom for pivotal mounting in the aligned bearing openings in said pairs of members, the arms and trunnions being of suitable size relative to the spacing of the members of each pair whereby one trunnion is insertable into one bearing opening and the bar moved to engage the respective arm and member to position the other trunnion between said members and then movement of the bar in the opposite direction inserts said other trunnion in the other of the aligned bearing openings, means fixed relative to the pairs of members and engageable by said one of the arms in response to upward swinging of the bar to hold said bar against movement longitudinally of the trunnions and to retain the trunnions in said bearing openings, and means pivotally connecting said flexible members to the respective bars of the connectors below the center of gravity of the container and intermediate the side edges of the walls having the pairs of spaced members thereon whereby operation of the elevating means to raise the flexible members will elevate the container.

4. In a container loading and unloading apparatus, the combination of a container having connected opposed side and end walls and a bottom wall, an elevating means having spaced flexible load-lifting members operable for up and down movement, brackets fixed relative to opposed walls of the container, spaced upright flanges on each of the brackets and extending outwardly therefrom in substantially perpendicular relation to the respective opposed walls of the container, aligned bearing openings in said spaced flanges, a pair of connectors, bearing members on the connectors and extending therefrom for pivotal mounting in the aligned bearing openings in the spaced flanges, the bearing members being suitably arranged relative to the spacing of said flanges whereby one bearing member is insertable in one bearing opening and the connector moved to position the other bearing member between said flanges and the movement of the connector in the opposite direction inserts said other bearing member in the other of the aligned bearing openings, cam means on one of the flanges above the bearing opening therein and extending toward the other flange of the bracket for engagement with the connector in response to upward swinging of the connector to hold said connector against movement longitudinally of the bearing members and retain the bearing members in said bearing openings, and means pivotally connecting the elongate flexible load-lifting members to the respective connectors intermediate the ends thereof.

5. In a container loading and unloading apparatus, the combination of a container having connected opposed side and end walls and a bottom wall, an elevating means having spaced flexible load-lifting members operable for up and down movement, brackets fixed relative to opposed walls of the container, spaced upright flanges on each of the brackets and extending outwardly therefrom in substantially perpendicular relation to the respective opposed walls of the container, aligned bearing openings in said spaced flanges, a pair of connectors, bearing members on the connectors and extending therefrom for pivotal mounting in the aligned bearing openings in the spaced flanges, the bearing members being suitably arranged relative to the spacing of said flanges whereby one bearing member is insertable in one bearing opening and the connector moved to position the other bearing member between said flanges and the movement of the connector in the opposite direction inserts said other bearing member in the other of the aligned bearing openings, cam means on one of the flanges above the bearing opening therein and extending toward the other flange of the bracket for engagement with the connector in response to upward swinging of the connector to hold said connector against movement longitudinally of the bearing members and retain the bearing members in said bearing openings, means pivotally connecting the elongate flexible load-lifting members to the respective connectors intermediate the ends thereof, said brackets and connectors being arranged relative to the container whereby the connection of the flexible members to the connectors is below the center of gravity of the container, each of said connectors having a portion extending beyond an adjacent wall of the container, and guide means on the extending ends of the connectors, and track means associated with the elevating means whereby the abutments and track cooperate with the flexible members to maintain the containers in upright condition during elevation thereof.

6. In a container loading and unloading apparatus, the combination of a container having connected opposed side and end walls and a bottom wall, an elevating means having spaced flexible load-lifting members operable for up and down movement, brackets fixed relative to opposed walls of the container, spaced upright flanges on each of the brackets and extending outwardly therefrom in substantially perpendicular relation to the respective opposed walls of the container, aligned bearing openings in said spaced flanges, a pair of connectors each having an elongate bar, spaced laterally extending arms on said bars with the spacing between the outer sides of said arms of each bar being less than the space between the extending flanges on said brackets, bearing members on the arms and extending therefrom for pivotal mounting in the aligned bearing openings in the spaced flanges, the arms and bearing members being of suitable size relative to the spacing of said flanges whereby one bearing member is insertable in one bearing opening and the bar moved to engage the respective arm and flange to position the other bearing member between said flanges and the movement of the bar in the opposite direction inserts said other bearing member in the other of the aligned bearing openings, cam means on one of the flanges above the bearing opening therein and extending toward the other flange of the bracket for engagement with the adjacent arm in response to upward swinging of the connector to hold said connector against movement longitudinally of the bearing-members and retain the bearing members in said bearing openings, means pivotally connecting the elongate flexible load-lifting members to the respective connectors intermediate the ends thereof, said brackets and connectors being arranged relative to the container whereby the connection of the flexible members to the connectors is below the center of gravity of the container, each of said connector bars having a portion extending beyond an adjacent wall of the container, and guide means on the extending ends of the bars, and track means associated with the elevating means whereby the abutments and tracks cooperate with the flexible members to maintain the containers in upright condition during elevation thereof.

7. A container loading and unloading apparatus for load-carrying vehicles having a load-carrying body with a receiving opening in the upper portion thereof and a power driven source of fluid pressure comprising, a container having connected side, end and bottom walls, spaced members extending outwardly from opposed walls of the container, a pair of connectors each having an elongate bar, means on said connector bars engageable with the spaced members on the opposed walls of the container for removably connecting said bars thereto with the bars extending transversely of said opposed walls, said bars having portions extending beyond an adjacent wall of the container, rollers on the extending ends of the bars, a pair of elongate flexible members each having a lower end thereof connected to an elongate bar of said connectors, spaced guide tracks on the load-carrying body and extending downwardly from the load-receiving opening therein, means fixing the upper ends of the flexible members relative to the load-carrying body on the opposite side of the opening relative to the container, means fixed relative to the body and operatively engaged with the flexible members for moving the flexible members to raise the container, means in the guide tracks adjacent the opening for stopping upward movement of the rollers whereby continued upward movement of the container tips same into the opening to dump the contents thereof, an arm pivoted on the container adjacent the stop means and engageable with the container connector during tilting movement of the container, hydraulic extensible means operatively connected with said arm, flow means connecting the source of fluid pressure to the hydraulic extensible means, and control means in the flow means for selectively applying the fluid pressure to the hydraulic extensible means for elevating the container out of the opening and into lowering position, and interengaging means on the connector bars and body cooperative to define a pivotal axis about which the container is tilted during dumping of the contents thereof.

8. A container loading and unloading apparatus for load-carrying vehicles having a load-carrying body with a receiving opening in the upper portion thereof and a power driven source of fluid pressure comprising, a container having connected side, end and bottom walls, ground-engaging wheels fixed to the bottom portion of the container for movably supporting said container, spaced members extending outwardly from opposed walls of the container, aligned bearing openings in said spaced members, a pair of connectors each having an elongate bar, means engageable in said bearing openings for removably and pivotally mounting elongate bars relative to the container with the bars extending transversely of said opposed walls, said bars having portions extending beyond an adjacent wall of the container, rollers on the extending ends of the bars, a pair of elongate flexible members, means pivotally connecting an elongate flexible member to each of the connectors below the center of gravity of the container, spaced guide tracks on the load-carrying body and extending downwardly from the load-receiving opening therein, said tracks each diverging laterally downwardly to a level below the rollers on the ends of the bars of the container connectors, means fixing the upper ends of the flexible members relative to the load-carrying body on the opposite side of the opening relative to the container, hydraulic extensible means having one end fixed relative to the body and the other end operatively engaged with the flexible members whereby extension of the extensible member moves the flexible members to raise the container, means in the guide tracks adjacent the opening for stopping upward movement of the rollers and automatically connecting said rollers relative to the guide tracks whereby continued upward movement of the container tips same into the opening to dump the contents thereof, an arm pivoted on the body adjacent the stop means and engageable with the container connector during tilting movement of the container, hydraulic extensible means operatively connected with said arm, flow means connecting the source of fluid pressure to the hydraulic extensible means, control means in the flow means for selectively applying the fluid pressure to the hydraulic extensible means connected with the arm for elevating the container out of the opening and into lowering position, and inter-engaging means on the connector bars and body cooperative to define a pivotal axis about which the container is tilted during dumping of the contents thereof.

9. Truck loading mechanism comprising, a truck, a power member thereon, spaced substantially upright guide tracks on one side of the truck, a container independent of the truck and having opposed ends spaced to register within the respective guide tracks, elevating means on the truck and including spaced cables operatively connected to said power member for up and down movement of said cables, spaced connector members on said opposed ends of the container, a pair of separate connectors each having an elongate bar with one connected to the lower end of one of said cables and the other connected to the lower end of the other cable, said cables being connected to the respective elongate bars intermediate the ends thereof, means on said connectors for removably securing the elongate bars thereof to the connector members on the container with said elongate bars extending transversely of the respective opposed ends of the container with end portions of said bars extending beyond the container toward the truck, rollers on said extending end portions of said elongate bars and adapted to engage the respective guide tracks, inter-engaging means on the connector members of the container and the elongate bars for retaining said elongate bars when secured thereto against movement transversely of the container, and inter-engaging means on said elongate bars of the connectors and guide tracks to define a pivotal axis about which the container is tilted when it reaches a predetermined position for dumping the contents thereof.

10. Truck loading mechanism comprising, a truck, a power member thereon, spaced substantially upright guide tracks on one side of the truck, a container independent of the truck and having opposed ends spaced to register within the respective guide tracks, elevating means on the truck and including spaced cables operatively connected to said power member for up and down movement of said cables, spaced connector members on said opposed ends of the container, a pair of separate connectors each having an elongate bar with one connected to the lower end of one of said cables and the other connected to the lower end of the other cable, said cables being connected to the respective elongate bars intermediate the ends thereof, means on said connectors for removably securing the elongate bars thereof to the connector members on the container with said elongate bars extending transversely of the respective opposed ends of the container with end portions of said bars extending beyond the container toward the truck, rollers on said extending end portions of said elongate bars and adapted to engage the respective guide tracks, lugs on each of said elongate bars spaced from the connection of the cables to said elongate bars, and inter-engaging means on the connector members of the container and the elongate bars for retaining said elongate bars when secured thereto against movement transversely of the container with said lugs positioned substantially at the vertical center of said opposed container ends, said cables extending under the respective lugs whereby upward movement of the cables applies a lifting force to the container substantially at said lugs.

11. Truck loading mechanism comprising, a truck, a power member thereon, spaced substantially upright guide tracks on one side of the truck, a container independent of the truck and having opposed ends spaced to register within the respective guide tracks, elevating means on the truck and including spaced cables operatively connected to said power member for up and down movement of said cables, spaced connector members on said opposed ends of the container, a pair of separate connectors each having an elongate bar with one connected to the lower end of one of said cables and the other connected to the lower end of the other cable, said cables being connected to the respective elongate bars intermediate the ends thereof, means on said connectors for removably securing the elongate bars thereof to the connector members on the container with said elongate bars extending transversely of the respective opposed ends of the container with end portions of said bars extending beyond the container toward the truck, rollers on said extending end portions of said elongate bars and adapted to engage the respective guide tracks, lugs on each of said elongate bars spaced from the connection of the cables to said elongate bars, inter-engaging means on the connector members of the container and the elongate bars for retaining said elongate bars when secured thereto against movement transversely of the container with said lugs positioned substantially at the vertical center of said opposed container ends, said cables extending under the respective lugs whereby upward movement of the cables applies a lifting force to the container substantially at said lugs, and inter-engaging means on said elongate bars of the connectors and guide tracks to define a pivotal axis about which the container is tilted when it reaches a predetermined position for dumping the contents thereof.

References Cited in the file of this patent

UNITED STATES PATENTS

| | | |
|---|---|---|
| 1,820,526 | Caldwell | Aug. 25, 1931 |
| 2,522,441 | Galloway | Sept. 12, 1950 |
| 2,847,135 | Galloway | Aug. 12, 1958 |

FOREIGN PATENTS

| | | |
|---|---|---|
| 514,423 | Great Britain | Nov. 7, 1939 |